Dec. 26, 1950 H. WOLFE 2,535,712

MULTIPLE GAP ERASE HEAD FOR MAGNETIC RECORDING

Filed Oct. 19, 1948

INVENTOR
H. WOLFE
BY
G. H. Heydt.
ATTORNEY

Patented Dec. 26, 1950

2,535,712

UNITED STATES PATENT OFFICE 2,535,712

MULTIPLE GAP ERASE HEAD FOR MAGNETIC RECORDING

Halley Wolfe, North Hollywood, Calif., assignor to Western Electric Company, Incorporated, New York, N. Y., a corporation of New York Application October 19, 1948, Serial No. 55,367

5 Claims. (Cl. 179—100.2)

This invention relates to magnetic sound recording and more particularly to improvements in a magnetic erase head for removing the recorded signal from a magnetic record carrier.

As is well known, signals may be recorded by varying the magnetic condition of a moving magnetic body by varying the flux density across the gap of the pole-pieces of a magnet adjacent to the moving magnetic body. Demagnetization of the magnetic carrier is usually effected by passing it over an erase head energized by a high frequency alternating current. Erasure of a magnetic signal is accomplished by passing the various elements of the record carrier through magnetizing cycles so that as the carrier leaves the gap, the intensity of the magnetizing cycles decreases to substantially zero.

In the usual construction of erasing magnets, there is provided a single gap between the pole-pieces of a magnetic core upon which is wound a coil carrying high frequency alternating current. In most cases, the gap of the erase head is considerably wider than that of the recording head in order that the magnetic field will fringe or spread out in such manner as to produce a field intensity that changes gradually rather than abruptly as in the recording head. This wide gap increases the reluctance of the magnetic core with the result that more ampere turns must be applied to the erase head than to the recording head in order to produce a magnetic field of satisfactory strength.

In accordance with the present invention, several gaps are incorporated between the pole-pieces of an erase head magnet so that in passing over the head only once the elements of the record carrier are subjected to a succession of demagnetizing processes. Each gap records the high frequency alternating current at high level, thus tending to obilterate any recorded signal that existed previously. However, when the carrier leaves the gap the recorded bias frequency disappears because of the self-demagnetization resulting from the extremely short wavelength. Each gap contributes to the obliteration effect, so that after the carrier has passed over the last gap, it is completely demagnetized and free of any recorded signal. Thus, although the effect is equivalent to that obtained by passing the carrier several times over an ordinary erase head, the process can be carried out with much greater speed and convenience.

An advantage of this head is that the sum of the gap widths can be made less than the width of the wide gap required in an ordinary erase head with the result that less ampere turns of magnetizing force will be required.

Although five gaps have been shown on the drawing, a successful erasing head of the type described has been built in which three gaps are used, so that an element of the recording carrier is subjected to three successive erasing processes in passing over the head. These gaps are 0.0005 inch wide and 0.30 inch long and are spaced 0.003 inch apart. They are formed by inserting a "sandwich" between the pole-pieces that consists of alternate layers of permalloy and beryllium-copper.

It has been found that because of the small total gap width, intense fields can be maintained without excessive power. Even with magnetic materials that are most difficult to erase fully modulated signals have been completely removed. This has been accomplished with power values sufficiently low so that the multiple gap erase head can be operated continuously without any significant temperature rise; stationary tape can be kept in contact with the pole-piece indefinitely without injury.

The invention will be understood from the following description, reference being had to the accompanying drawing in which.

Figure 1:
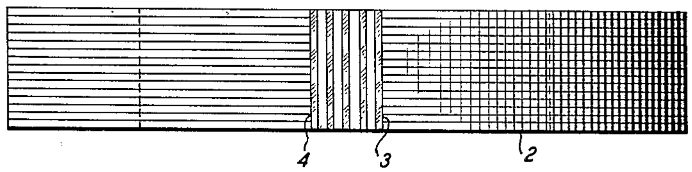
Fig. 1 is a plan view of the erasing magnet.
Figure 2:
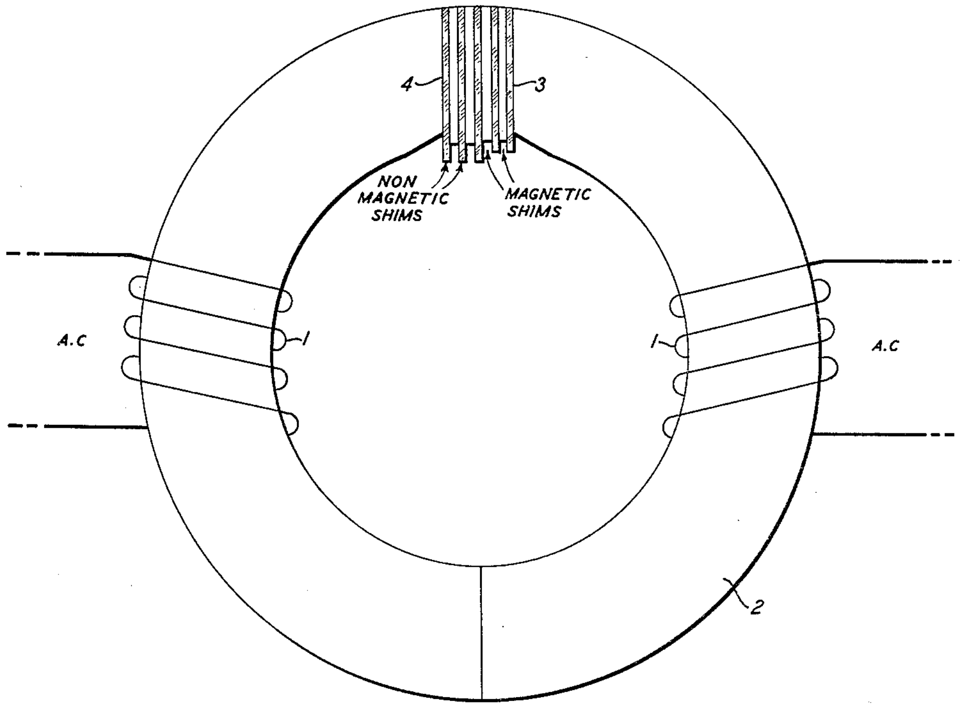
Fig. 2 is a diagrammatic side elevation of the erasing head.

In the drawing, coils 1—1 are suitably wound on the core 2 to establish a magnetic field between the faces of the pole-pieces 3 and 4. Alternating current from a source (not shown) is impressed across the coils 1—1. The core may be constructed of toroidal magnetic laminations, although it need not be limited to the form or material shown. Between the pole-pieces 3 and 4 alternate layers of magnetic and non-magnetic shims are inserted. The shims of magnetic material could be pieces of the same material from which the pole-piece laminations are made, such as permalloy or other suitable magnetic material, while the non-magnetic shims could be made of any suitable non-magnetic material such as beryllium-copper, mica, etc. It is understood that air spaces could be used to provide non-magnetic gaps, in which case, the intermediate magnetic shims would necessarily be carried by non-magnetic supports.

Figure 3:
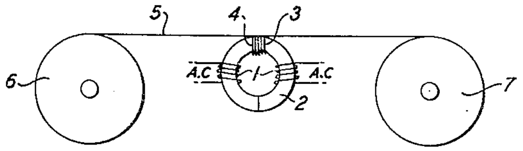
Fig. 3 shows a system employing the erase magnet head.

As shown in Fig. 3, the pole-pieces 3 and 4 are positioned in operative relation to a linear magnetic record carrier 5 wound on reels 6 and 7.

The reels are suitably driven to move the record carrier past the multiple gaps. When the coils are energized, each gap successively obliterates the magnetic condition of the carrier, so that when the carrier has passed over the last gap, it is completely demagnetized and free of any recorded signal. Although in the illustration a linear record carrier is shown, it is understood that any type of magnetic carrier may be used.

What is claimed is:

1. An erasing head comprising a magnet core having spaced pole-pieces, an energizing coil wound on said core, and layers of non-magnetic and magnetic materials alternately disposed between said pole-pieces in such manner that said magnetic material does not contact said core, the faces defining the thickness of each of said layers being substantially plane.

2. An erase magnet comprising a core, an energizing coil wound on said core, and layers of non-magnetic and magnetic materials alternately disposed in a gap in the magnetic circuit of said magnet in such manner that said magnetic material does not contact said core, the faces defining the thickness of each of said layers being substantially plane.

3. An erase head comprising a circular magnet core, an energizing coil wound on said core, and a plurality of layers of magnetic and non-magnetic materials alternately disposed in a gap in the magnetic circuit of said head in such manner that said magnetic material does not contact said core, and the outer edges of said layers together with the periphery of said core form a circle.

4. In a magnetic recording and/or reproducing system a magnetic record carrier, an erasing head comprising a magnet core having spaced poles, an energizing coil wound on said core, layers of non-magnetic and magnetic materials alternately disposed between said poles to form a plurality of gaps across each of which said record carrier travels, each of said gaps successively affecting the magnetic condition of said record carrier, said layers being disposed in such manner that said magnetic material does not contact said core.

5. An erasing head comprising a magnet core having a portion removed therefrom to define two spaced poles, an energizing coil wound on said core, layers of non-magnetic and magnetic materials alternately disposed between said poles in such manner that said magnetic material does not contact said core and the outer edge of each of said magnetic layers extends to but not beyond the boundary defined by the periphery of said core prior to the removal of said portion.

HALLEY WOLFE.

REFERENCES CITED

The following references are of record in the file of this patent:

UNITED STATES PATENTS

| Number | Name | Date |
|---|---|---|
| 2,215,782 | Ellis | Sept. 24, 1940 |
| 2,418,542 | Camras | Aug. 8, 1947 |
| 2,459,299 | West | Jan. 18, 1949 |

FOREIGN PATENTS

| Number | Country | Date |
|---|---|---|
| 617,796 | Germany | Aug. 28, 1935 |